UNITED STATES PATENT OFFICE.

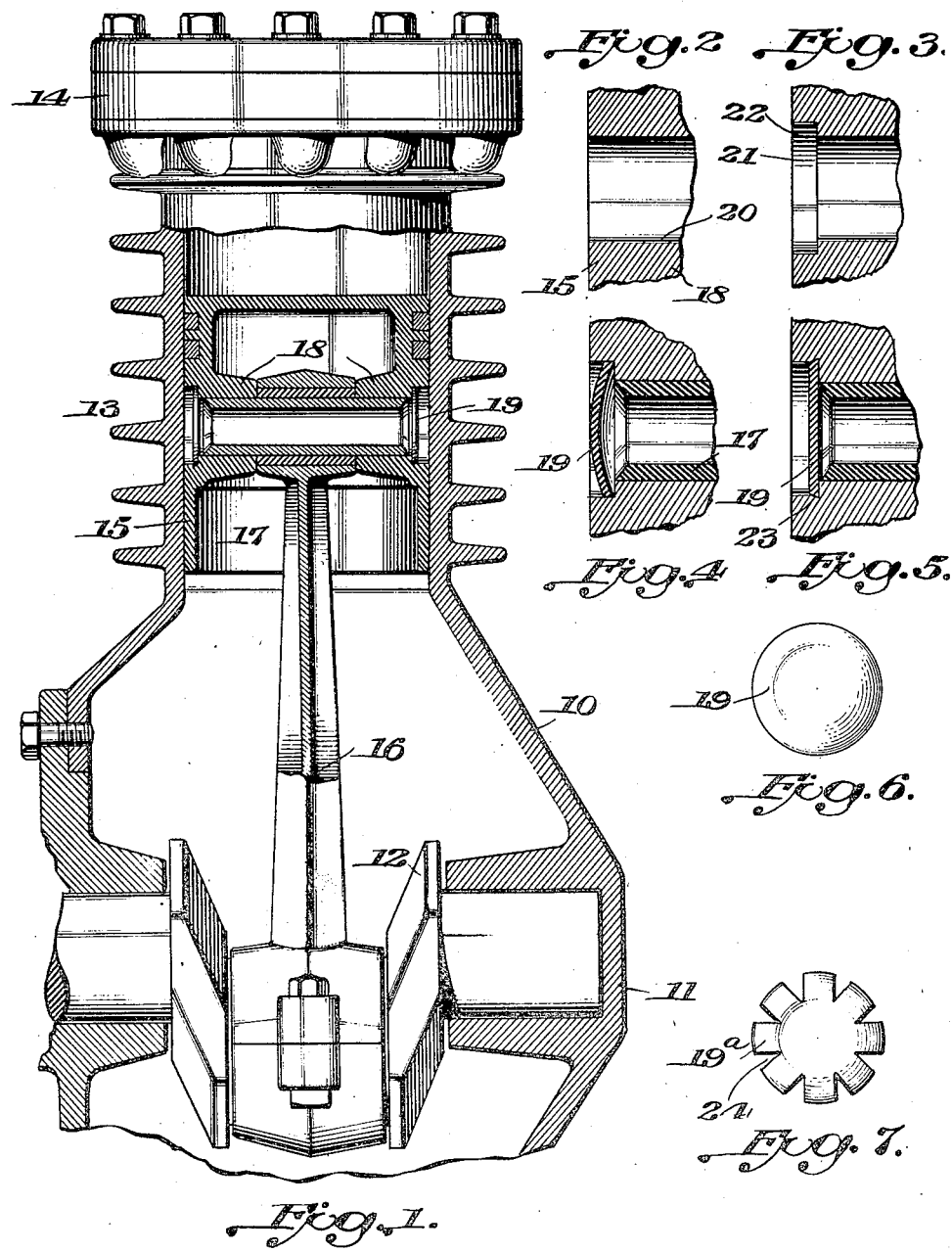

CHARLES L. McCUEN, OF DETROIT, MICHIGAN, ASSIGNOR, BY MESNE ASSIGNMENTS, TO THE ISKO COMPANY, OF CHICAGO, ILLINOIS, A CORPORATION OF DELAWARE.

CYLINDER AND PISTON CONSTRUCTION.

1,285,755. Specification of Letters Patent. Patented Nov. 26, 1918.

Application filed December 5, 1917, Serial No. 205,538. Renewed October 21, 1918. Serial No. 259,144.

*To all whom it may concern:*

Be it known that I, CHARLES L. McCUEN, a citizen of the United States, and resident of Detroit, Wayne county, State of Michigan, have invented certain new and useful Improvements in Cylinder and Piston Constructions, of which the following is a specification.

This invention relates to cylinder and piston construction and particularly to means for retaining the piston pin in place in the piston.

Heretofore it has been the usual practice to secure the piston pin to either the piston or connecting rod to prevent it from rubbing against the cylinder during reciprocation of the piston.

It is one of the objects of the present invention to provide a device to be secured to the piston at the ends of the piston pin to prevent the endwise movement of the pin.

In some cases it is desirable to close the outer ends of the openings in the piston pin bosses for the purpose of retaining lubricant in the piston pin and the bearings thereof. It is one of the objects of the present invention to provide means for closing the outer ends of the piston pin bosses and at the same time retain the piston pin in place.

Another object of the invention is to provide an expanded disk in the piston at the outer ends of the pin bosses for the purpose of retaining the piston pin in place.

Other objects of the invention will appear from the following description taken in connection with the drawings which form a part of this specification, and in which:

Figure 1 is a vertical sectional view through a compressor embodying a cylinder and piston construction illustrative of the invention;

Figs. 2, 3, 4 and 5 are enlarged detail views showing the various steps in applying the expanded disk to a piston;

Fig. 6 is a face view of one of the disks; and

Fig. 7 is a view similar to Fig. 6 showing another form of disk.

Referring to the drawings, 10 represents a small compressor of usual construction comprising a crank case 11 with the crank shaft 12 therein, and a cylinder 13 mounted above the crank case and having a head 14.

Mounted to reciprocate in the cylinder 13 is a piston 15 connected to the crank shaft 12 by a connecting rod 16. The upper end of the connecting rod 16 is pivotally connected to the piston 15 by means of a piston pin 17 mounted in bosses 18 of the piston.

It will be understood that the piston pin 17 is free to move endwise and rotate both in the upper end of the connecting rod and in the bosses 18. For the purpose of preventing the pin from moving endwise into contact with the cylinder walls the outer ends of the bosses 18 are provided with closing means in the form of disks 19 which are expanded into place as shown in Figs. 2, 3, 4 and 5. Referring to said latter figures, Fig. 2 shows the outer end of the piston pin boss 18 with an opening 20 therein for the piston pin. Fig. 3 shows how the opening 20 has been drilled out or enlarged as at 21 to form a shoulder 22. Fig. 4 shows a metal disk of slightly concavo-convex form fitting in the enlarged part 21 of the opening against the shoulder 22, the piston pin 17 having been first inserted in the piston. In Fig. 5 the disk 19 has been expanded into substantially flat form by blows exerted against its outer face, so that its periphery is embedded in the metal of the piston at the shoulder 22 as shown at 23. Thus, the disk is secured in the piston at the outer end of the opening 20 and besides retaining the piston pin in place it also closes the outer end of the opening. In this construction as used with a hollow piston pin 17 as shown, considerable lubricant may be retained within the piston pin by feeding it upwardly through the connecting rod or otherwise.

In some cases it is desirable that the outer ends of the openings 20 shall permit the passage of lubricant either from the cylinder walls inwardly to the piston pin bosses or from the piston pin outwardly to the cylinder walls when the piston pin is fed with oil under pressure. In such cases the disk 19 may be formed as shown in Fig. 7, where the disk 19ª is cut with V-shaped openings 24. Other shapes of openings may be provided in the disk for this purpose.

It will be understood further that my invention is not limited to the details of construction shown and other forms may be used without departing from the spirit or scope of the invention.

Having thus described my invention, what

I claim and desire to secure by Letters Patent is:—

1. In a cylinder and piston construction, the combination with a cylinder and a piston sliding therein, said piston having pin bosses opening through its sides, of a piston pin in said piston, and means for closing the outer ends of said bosses.

2. In a cylinder and piston construction, the combination with a cylinder and a piston sliding therein, said piston having pin bosses opening through its sides, of a piston pin in said piston, and means for closing the outer ends of said bosses and retaining the pin in place.

3. In a cylinder and piston construction, the combination with a cylinder and a piston sliding therein, said piston having pin bosses opening through its sides, of a piston pin in said piston, and an expanded disk closing the outer ends of each of said bosses and retaining the pin therein.

4. A piston having an opening therethrough for a piston pin, a pin in said piston, and an expanded disk at the end of said opening to retain said pin therein.

5. A piston having an opening therethrough for a piston pin, said opening being enlarged near its outer end to form a shoulder, and a disk expanded against said shoulder to retain the pin in place.

6. A piston having an opening therethrough for a piston pin, said opening being enlarged near its outer end to form a shoulder, and a disk expanded against said shoulder, said disk having openings therethrough for the purpose described.

7. A hollow piston having alined openings through its wall for a piston pin, a pin fitted in said openings, and means for holding the pin from endwise movement including a circular member disposed in the outer end of one of said openings and positively secured against rotation in the opening independently of the pin.

8. In combination with a cylinder, a piston slidably mounted therein having alined openings for a piston pin, a pin fitted in said openings and means out of contact with the cylinder for closing the outer ends of said openings.

9. In combination with a cylinder, a piston slidably mounted therein having alined openings for a piston pin, a hollow pin fitted in said openings, and means for closing the outer ends of said openings, whereby lubricant may be retained within the pin.

10. A hollow piston having alined openings through its wall for a piston pin, a pin fitted in said openings, and means secured to the piston for closing the outer ends of said openings.

11. A hollow piston having alined openings through its wall for a piston pin, a pin fitted in said openings, and means secured to the piston for closing the outer ends of said openings and retaining the pin in place.

12. A hollow piston having alined openings through its wall for a piston pin, a pin fitted in said openings for rotative movement therein, and means for holding the pin from endwise movement including a circular member disposed in the outer end of one of said openings and positively secured against rotation in the opening.

In testimony whereof I affix my signature.

CHARLES L. McCUEN.